(12) United States Patent
Kraibühler et al.

(10) Patent No.: US 9,539,765 B2
(45) Date of Patent: Jan. 10, 2017

(54) METHOD FOR DISCHARGING A VOLUME FLOW

(71) Applicant: Arburg GmbH + Co. KG, Lossburg (DE)

(72) Inventors: Herbert Kraibühler, Lossburg (DE); Eberhard Duffner, Starzach (DE); Oliver Kessling, Lossburg-Lembach (DE)

(73) Assignee: ARBURG GMBH + CO. KG, Lossburg (DE)

( * ) Notice: Subject to any disclaimer, the term of this patent is extended or adjusted under 35 U.S.C. 154(b) by 368 days.

(21) Appl. No.: 14/203,860

(22) Filed: Mar. 11, 2014

(65) Prior Publication Data

US 2014/0191433 A1    Jul. 10, 2014

Related U.S. Application Data

(63) Continuation of application No. PCT/EP2013/000717, filed on Mar. 12, 2013.

(Continued)

(30) Foreign Application Priority Data

Mar. 14, 2012 (DE) ........................ 10 2012 004 988

(51) Int. Cl.
*B29C 67/00* (2006.01)
*B33Y 10/00* (2015.01)

(52) U.S. Cl.
CPC ....... *B29C 67/0088* (2013.01); *B29C 67/0059* (2013.01); *B29C 67/0081* (2013.01); *B33Y 10/00* (2014.12)

(58) Field of Classification Search
None
See application file for complete search history.

(56) References Cited

U.S. PATENT DOCUMENTS

| 5,002,475 A | 3/1991 | Graefe | |
|---|---|---|---|
| 2004/0003738 A1* | 1/2004 | Imiolek | B22F 3/1055 101/480 |

(Continued)

FOREIGN PATENT DOCUMENTS

| DE | 102004025374 A1 | 2/2006 |
|---|---|---|
| EP | 1886793 A1 | 2/2008 |

(Continued)

OTHER PUBLICATIONS

International Search Report for corresponding application PCT/EP2013/000717 filed Mar. 12, 2013; Mail date Jun. 25, 2013.

*Primary Examiner* — Mary F Theisen
(74) *Attorney, Agent, or Firm* — Cantor Colburn LLP

(57) ABSTRACT

In a method for discharging a volume flow consisting of successive drops to produce a three-dimensional object of solidifiable material present in a fluid phase, the fluid phase of the material is introduced into a material storage means. A pressure (p) is applied to the fluid phase, in order to discharge the material in drops out of a cyclable outlet opening to build up the three-dimensional object in a construction chamber. A method is provided for achieving a constant, discontinuous volume flow by the pressure (p) being regulated via a closed-loop control in the event of a change in the viscosity of the fluid phase of the material, while maintaining the other process parameters, to achieve a predetermined drop size. The pressure is applied by a conveying element, the average displacement velocity of the conveying element per discharged drop being converted as a measured variable into the control variable for the closed-loop control.

6 Claims, 3 Drawing Sheets

Related U.S. Application Data

(60) Provisional application No. 61/776,048, filed on Mar. 11, 2013.

(56) References Cited

U.S. PATENT DOCUMENTS

| | | | |
|---|---|---|---|
| 2005/0167872 A1* | 8/2005 | Tsubaki | B29C 67/0081 264/113 |
| 2007/0211128 A1 | 9/2007 | Parker et al. | |
| 2008/0233302 A1* | 9/2008 | Elsner | B29C 67/0059 427/421.1 |

FOREIGN PATENT DOCUMENTS

| | | |
|---|---|---|
| EP | 2266782 A1 | 12/2010 |
| WO | 03041875 A1 | 5/2003 |
| WO | 2004062890 A1 | 7/2004 |

* cited by examiner

METHOD FOR DISCHARGING A VOLUME FLOW

CROSS REFERENCE TO RELATED APPLICATIONS

This application is related to and claims the benefit of U.S. Provisional Application No. 61/776,048 filed on Mar. 11, 2013. This application is also a continuation of International Patent Application Number PCT/EP2013/000717, filed on Mar. 12, 2013 which claims priority to German patent application number 10 2012 004 988.9, filed on Mar. 14, 2012. The content of all of said applications are herein incorporated by reference in their entirety.

TECHNICAL FIELD

The invention relates to a method for discharging a volume flow consisting of successive drops to produce a three-dimensional object.

BACKGROUND

Such a method is known from EP 2 266 782 A1, wherein the therein disclosed device delivers solidifiable material plasticized with a plasticising unit known in injection molding technology in a fluid phase into a material storage. The material storage is pressurized and this pressure is used to discharge the material in the form of drops via a clockable discharge opening in order to produce a three-dimensional object in a construction chamber. The fluid phase of the material comprises a temperature dependent viscosity. A solid body joint is used for discharging the drops at the discharge opening, the pretension of which can be regulated. For this purpose the operation point of the solid body joint is measured and readjusted, if necessary. Specific displacement/force curves can be driven with an actuating element actuating the solid body joint, in order to targetedly and consciously influence the form of the drops.

Such a method is also known from DE 10 2004 025 374 A1, in which drops of one reaction component are discharged and brought into contact with a basis reaction component present on a substrate, in order to produce a three-dimensional object with varying material characteristics layer by layer. This causes a gradual transition from one material characteristic to another material characteristic. The drop size can be regulated in dependency of a measured layer thickness without having attention to the viscosity of the processed material which viscosity may eventually change during the production process.

EP 1 886 793 B1, in which a plasticising unit known in injection molding technology is coupled to a pressurized material storage means to produce a fluid phase of a material. To produce an object on an object support in a construction chamber, this material is discharged via a discharge opening in the form of drops, it being necessary to apply a high pressure and generally also high temperatures due to the adhesive strength of the material.

In this device the advantages of plastics parts production using standard materials used conventionally in injection molding is combined with the possibility of producing plastics parts for single-item or small batch production. It allows parts to be produced without a mold which parts have properties similar to those of injection-molded parts.

To produce such individual parts or small batch sizes, such as for example samples, further manufacturing processes are also known, which are known widely as "prototyping" and "rapid manufacturing". Such parts are produced without using molds, the geometry in most cases being produced on the basis of 3D data. These geometries are produced in a wide variety of forms using appropriate means such as melting powder layers by the application of heat, for example by means of a laser, additive systems such as printing processes, the powder particles being bound in different ways, or also using so called melt strand methods.

In practice it has been found that when using the method known from EP 1 886 793 A1 for production purposes, a relatively long construction time is needed for one part. Although as little melt as possible is kept in the melt pressure generator and thus in the entire system through the geometric construction, on the other hand this amount must not be too little, since otherwise every opening of the outlet opening on the discharge of the drops has a significant dynamic effect on the pressure level, which the melt pressure controller cannot track due to the inertia thereof. On the other hand, the amount of plastics discharged is dependent on the following parameters: temperature, the liquefied melt in the pressure generator, melt pressure and outlet nozzle geometry and also opening times and stroke of the orifice plate of the outlet opening and also the viscosity of the molten material influenced by the total residence time. In addition, the intrinsic viscosity of the plastics material reduces viscosity at higher shear rates, which in turn affects drop size and their tendency to coalesce with drops which already previously have been discharged.

The prior art also discloses a measurement method in which material discharge per unit time from the nozzle is determined. The value is stated in g/10 min, the plastics material being forced through a nozzle with a diameter of 2.095 mm by means of a plunger. The necessary force is applied by a weight. When stating the values the test temperature and nominal mass used must always be stated. The method is defined according to DIN EN ISO 1133. When determining the MFI value, which corresponds to the melt flow rate, established in this way, the fluidity of the plastics material is determined only at a defined operating point. Any change in fluidity as process parameters change, in particular as a function of residence time, is not taken into account.

BRIEF SUMMARY

Based on this prior art, the object of the present invention is to provide a method for achieving a constant, discontinuous volume flow.

According to the invention, the process-related instantaneous initial intrinsic viscosity is determined at a starting point or reference point and used as a correcting variable for drop size by means of the process control element. The control variable is the pressure in the material storage means, wherein the average displacement velocity of the pressure-generating conveying element per discharged drop is determined as a measured variable and changes thereto with otherwise constant process parameters are used as correcting variables for the pressure.

Closed-loop control enables the compensation of disturbing influences or differences in general intrinsic viscosity for example resulting from fluctuations in raw material batches relative to an independently measured model reference point. Similar disturbing influences may also arise as a result of the residence time of the material in the material storage means.

Pressure is advantageously applied by an injection screw, on which a non-return valve is mounted as closing element.

Such a non-return valve may exhibit a leakage flow, which may be taken into account by a correction factor when determining characteristic values of the control algorithm.

Further advantages arise from the subclaims and the following description of an exemplary embodiment.

BRIEF DESCRIPTION OF THE DRAWINGS

The invention is explained in greater detail below with reference to an exemplary embodiment illustrated in the figures, in which.

DESCRIPTION OF PREFERRED EMBODIMENTS

Before the invention is described in detail, it should be pointed out that it is not limited to the particular components of the device and the particular method steps, since these components and methods may vary. The terms used herein are merely intended to describe particular embodiments and are not used in a limiting manner. In addition, where the description or the claims uses the singular or indefinite article, this also covers a plurality of said elements, providing that the overall context does not unambiguously indicate otherwise.

Figure 1:
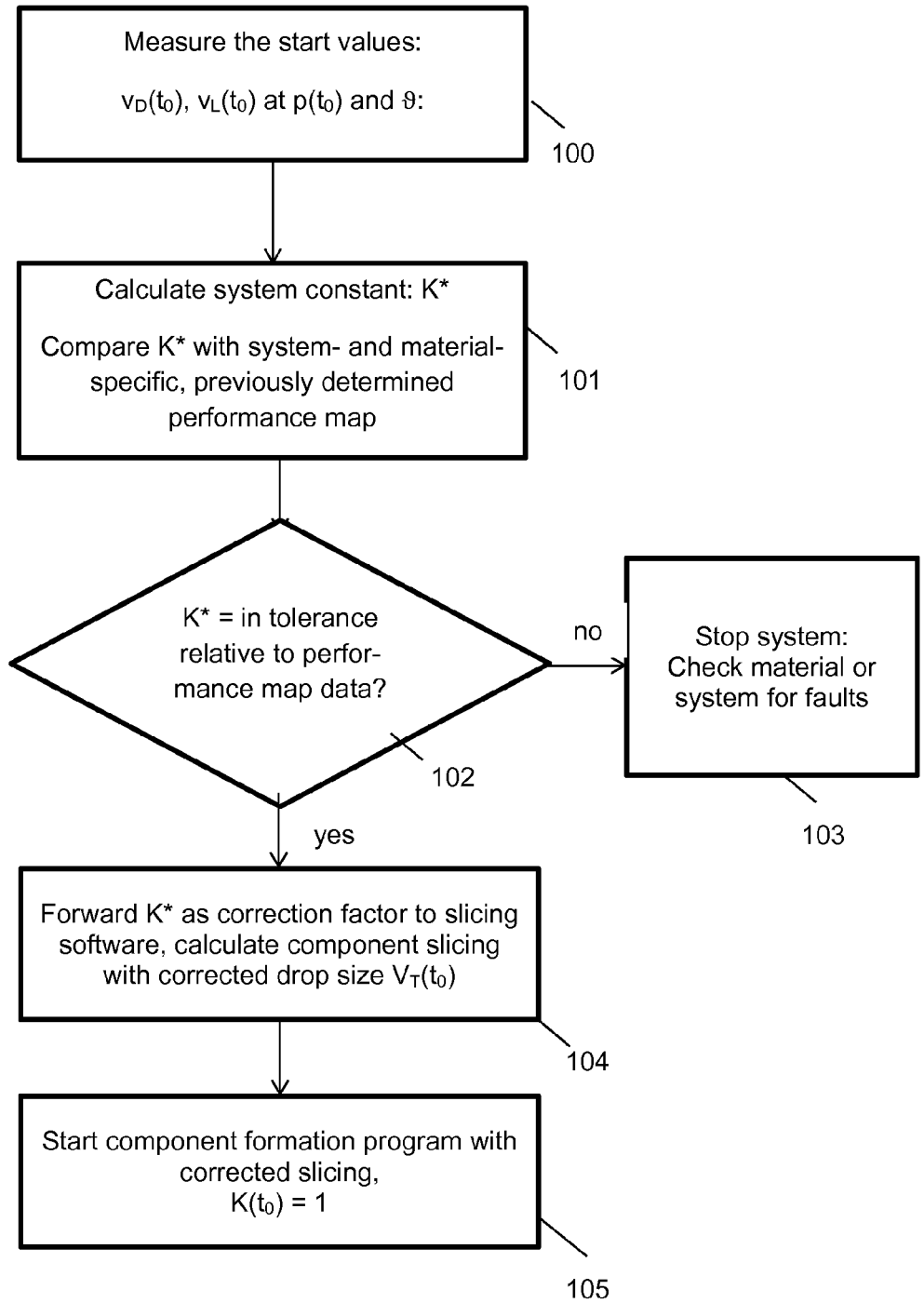
FIG. 1 shows a flow diagram for determining the system characteristic value and the initial drop size.
Figure 2:
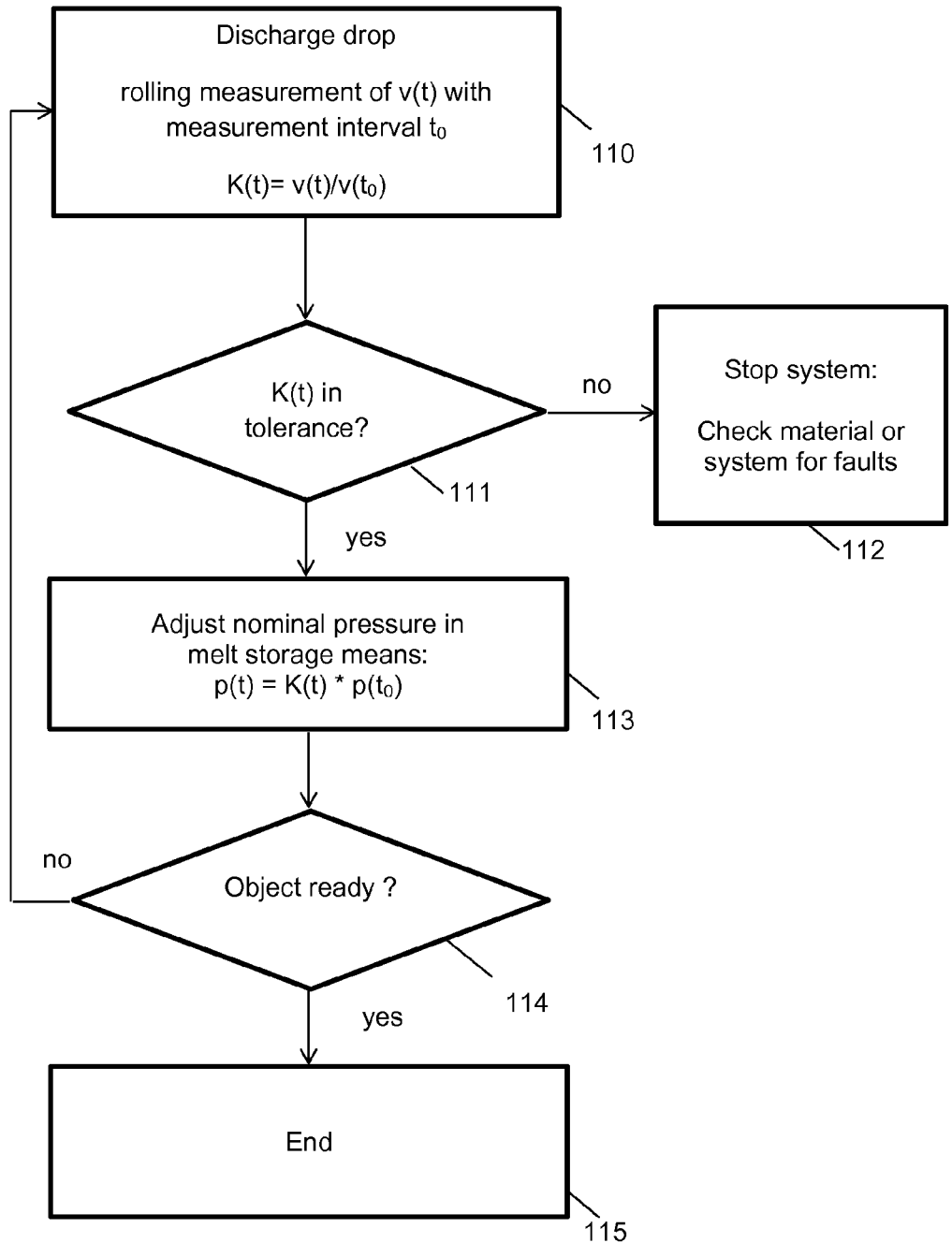
FIG. 2 shows a flow diagram for characteristic value control ensuring constant drop size with pressure as the control variable.
Figure 3:
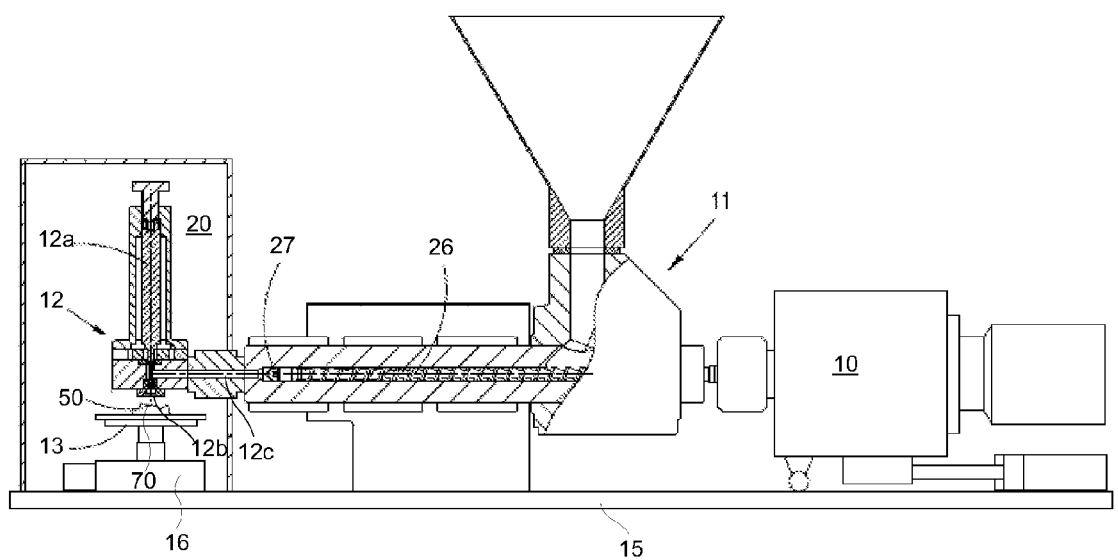
FIG. 3 is a partially sectional view of a device for producing of a three-dimensional object.

Before looking at the procedure according to FIGS. 1 and 2, first of all an explanation will be provided of the device for producing a three-dimensional object 50 or a component of solidifiable material according to FIG. 3. The material, which is either in a fluid phase at the outset or is liquefiable, serves to produce a three-dimensional object 50 by sequential discharge of drops 70. This may for example proceed in that individual drops 70 are discharged sequentially from an outlet opening 12b of a discharge unit 12, such that the object 50 arises slice by slice in the construction chamber 20 on an object support 13 movable relative to the outlet opening 12b by a drive unit 16. The solidifiable material is a plasticised material, such as for example silicone, or a plasticizable material such as thermoplastics or indeed pulverulent materials. These materials may be the injection molding materials which are conventionally obtainable and are thus relatively inexpensive, since no special rapid prototyping materials are needed. The material may also be a material which can be melted reversibly when exposed to heat and is thus recyclable. Any other materials may be used, provided that said materials can be plasticised by the device and above all can be discharged by the at least one discharge unit 12.

The material is plasticised or processed in the processing unit 11 arranged on a supporting table 15 and pressurized by the pressure generating unit 10. The pressure p determines as the melt temperature θ or the cycle time $t_B$ or the cycle movement $s_B$ of the outlet opening 12b the formation of the drops 70 and thus the quality of the object 50 to be produced. The desired volume of the drop 70 is in particular in the range from 0.01 to 1 mm³. The diameter of the outlet opening 12b is in particular less than or equal to 1 mm, preferably around 0.1 mm. At a wholly conventional conveying velocity of a conveying element of 100 cm/s, said conveying element conveying the melt through a so-called pin gate 0.1 mm in diameter, a value of 10,000 m/s is obtained for volume flow by area. This leads in the pseudoplastic mass to a laminar frontal flow with flow velocities of up to 10,000 m/s.

The fluid phase of the material in the material storage means 12c may be discharged via an outlet opening 12b, actuated by the drive part 12a, to yield the object 50. At the outlet opening 12b an orifice plate may be used which preferably takes the form of a flexure hinge or a solid body joint according to EP 2 266 782 A1.

The processed material is in general a so-called non-Newtonian fluid. Its intrinsic viscosity η is heavily dependent on arbitrary process settings such as temperature, pressure, residence time under heat, degree of drying of initial solid, etc. The slice structure calculated from the CAD models of a part to be formed is however preferably based on a constant drop size. However, since intrinsic viscosity is inversely proportional to drop size, it is necessary, while the object 50 is being constructed, to compensate a temporary change in intrinsic viscosity or to make such an adjustment from the outset with regard to batch-to-batch variation. The following method is used for this purpose.

To ensure that a preferably constant discontinuous volume flow consisting of successive drops is discharged, the fluid phase of the material is introduced into the material storage means 12c. A pressure p is applied to the fluid phase of the material in the material storage means 12c. Under this pressure the material is discharged in the form of drops 70 from a cyclable outlet opening 12b, in order thereby to build up the three-dimensional object 50 in the construction chamber 20. The fluid phase has a temperature θ.

To keep the volume flow constant, the process parameter the pressure p is tracked in the event of changes in the viscosity of the fluid phase of the material, while maintaining the other process parameters. To this end, in step 100 according to FIG. 1 the necessary parameter is measured, i.e. in particular the pressure $p(t_0)$, the theoretically calculated throughput volume $v_D(t_0)$ through the orifice plate, the leakage volume $v_L(t_0)$ through the blocking ring of the non-return valve 27 and the temperature θ of the material. In addition or alternatively, the frequency f of the number of drops per second, the travel s of a conveying element, the cycle time $t_B$ or cycle movement $s_B$ of the outlet opening 12b, the cross-sectional area $A_S$ of the processing unit, in which the conveying screw 26 is accommodated, and the diameter $d_D$ of the outlet opening can be measured.

Hereinafter, control of the constant drop volume by means of the control variable consisting of the pressure p produced by the conveying element (screw 26) is described.

At the starting (reference) time $$t_0 = n_0/f \qquad \text{(Formula 1)}$$

(i.e. $n_0$ drops are being formed at the time $t_0$) of component production, a reference characteristic is formed as a substitute for theoretical viscosity, wherein $t_0$ is the time after which $n_0$ drops have been discharged and at a later time t, which is any integral multiple of the measurement interval $t_0$:

$$k(t) = \frac{\eta(\vartheta, p, t)}{\eta(\vartheta, p, t_0)} \qquad \text{(Formula 2)}$$

In a linearly approximated process environment, the total drop volume $v_D$ at the time t and under the aperture opening function $t_B(t)$ obeys the Hagen-Poiseuille law:

$$v_D = \text{nozzle constant} * \frac{p(t)_* t_B(t)}{\eta(\vartheta, p, t)} \quad \text{(Formula 3)}$$

Since the drop volume is intended to be constant over the entire construction process, i.e.

$$v_D(t_0) = v_D(t)$$

the following is obtained from formula 3

$$p(t) = p(t_0) \frac{t_B(t_0)}{t_B(t)} \frac{\eta(\vartheta, p, t)}{\eta(\vartheta, p, t_0)} \quad \text{(Formula 4)}$$

and with a constant aperture opening function $tB(t)=tB(t_0)$ $$p(t) \approx k(t) * p(t_0) \quad \text{(Formula 5)}$$

and thus a direct proportionality between adjusted pressure and the possibly varying relative viscosity characteristic as a relation for a possible drop volume constancy controller.

On the other hand, under ideal tightness conditions of the non-return valve on the pressure generating screw, the discharged volume of melt up to the time t0 or in the time interval between t and $t-t_0$ can be measured by determining the corresponding screw travel. The average single drop volume $V_T(t)$ is obtained by division with the number $n_0$ of discharged drops in the corresponding interval $t_0$:

$$V_{drops,measured}(t) = f(p(t)) * \quad \text{(Formula 6)}$$

$$\frac{\text{screw travel}(t) - \text{screw travel}(t-t_0)}{n_0} * \text{screw diameter}$$

As a result of the requirement for constant drop volume the following is obtained at the measurement time $t_0$ and t:

$$f(p(t)) = f(p(t_0)) * \frac{\text{screw travel}(t_0) - \text{screw travel}(0)}{\text{screw travel}(t) - \text{screw travel}(t-t_0)} \quad \text{(Formula 7)}$$

with the characteristic value calculated by measuring screw travel $$K(t) = \frac{\text{screw travel}(t_0) - \text{screw travel}(0)}{\text{screw travel}(t) - \text{screw travel}(t-t_0)} \quad \text{(Formula 8)}$$

It has been found that, although the function $f(p(t))$ is actually defined by way of the pVT performance map of the processed material, a direct comparison of the interrelationships between formula 7 and formula 5 does allow good drop volume constancy control using pressure correction through the measured characteristic value $K(t)$.

Since screw travel for one drop may be very small and in the actual system may furthermore be very susceptible to faults due to leakage of the blocking ring of the non-return valve, $n_0 \geq 10$ to 100 drops should be averaged over a larger number of drops. The change in screw travel over a given number $n_0$ of drops is therefore considered in time-discrete $t_0$ portions.

In a material pressure generator with screw, the gap between barrel and blocking ring acts in the same way as a leakage flow aperture for the pressurized plasticised material. This means that the measured average volume displacement v is made up of $v_L(t)$ (leakage flow via the blocking ring) and $v_D(t)$ (volume discharged through the nozzle):

$$v = v_D + v_L \quad \text{(Formula 9)}$$

with:
$v_D$ = volume discharged out of the discharge nozzle in measurement interval $t_0$
$v_L$ = volume through non-return valve 27 in measurement interval $t_0$ The leakage volume through the blocking ring behaves as described in Formula 3 for the discharge nozzle only with another system constant, which is dependent on the gap between barrel and blocking ring.

$$vL = \text{system constant blocking ring} * \frac{p(t)_* t_0}{\eta(\vartheta, p, t)} \quad \text{(Formula 10)}$$

The value of the leakage volume $v_L(t)$ in a measurement interval $t_0$ can be measured at any time by closing the outlet nozzle:

$$v_{L,measured}(t) = (\text{screw travel}(t) - \text{screw travel}(t-t_0))$$
$$* \text{screw diameter} \quad \text{(Formula 11)}$$

If the outlet opening 12b is opened in a steady state, the total volume variation at the material pressure generator increases. The total volume v(t) can be measured with simultaneous actuation of the discharge nozzle by means of aperture function $t_B(t)$ again in accordance with formula 11. As a result of the known leakage volume $v_L$ and transposition of formula 9, it is possible to draw conclusions as to the nozzle volume through the outlet opening at the time t in the measurement interval $t_0$.

$$v_D = v - v_L \quad \text{(Formula 12)}$$

The ratio of the discharged volume and the leakage volume forms according to formula 3 and formula 10, and with constant aperture function tB(t), a system-specific constant:

$$K^* = v_L(t)$$

$$v_D(t) \quad \text{(Formula 13)}$$

The system constant $K^*$ calculated in step 101 substantially contains the geometry of the leakage gap between blocking ring and barrel of the melt pressure generator and the outlet geometry of the discharge nozzle at constant orifice time and orifice opening travel. It may be determined by means of preliminary tests as a performance map dependent on the set process parameters and the material used and also re-established each time construction begins afresh, in order to improve the precision of component slicing. If $K^*$ is in the tolerance range relative to these performance map data (query 102), $K^*$ may be transmitted as a correction factor to the slicing software before the component process starts (step 104) and the component formation program may be started with corrected slicing or drop size (step 105). Otherwise the system is stopped at step 103.

Insertion into the above formula 12 yields:

$$v_D(t) = v(t)/(1+K^*) \quad \text{(Formula 14)}$$

By rolling measurement in step 110 of v(t) and with the number $n_0 = t_0 * f$ of discharged drops in the measurement interval, the drop volume $$V_T(t) = v_D(t)/n_0 = v(t)/(n_0 * (1+K^*)) \quad \text{(Formula 15)}$$

can then be directly determined and transmitted to the slicing software prior to the start of the component process.

To keep the drop size constant during the construction process, the characteristic value controller for the process control variable pressure serves, as derived in formula 5, to compensate varying viscosities of the material due to the residence time or small changes for example in the closure mechanism of the discharge nozzle. For the characteristic value K(t) or alternatively for the pressure p(t), a maximum process window can be defined (query 111), a system defect being detected if this is exceeded (for example clogged discharge aperture or leakage between material storage means 12c and discharge orifice at the outlet opening 12b) and the installation is stopped according to step 112.

Otherwise the pressure is adjusted as required in step 113, until the component is finished (query 114, step 115).

Example of the system characteristic value K and initial drop size $V(t_0)$:

In an actual device, with a discharge nozzle diameter of 0.15 [mm], a screw with a diameter of 15 [mm] at a pressure of 400 [bar] in the material pressure generator, a drop frequency of 90 [Hz] and an aperture time of $t_B(t)=0.5*t_0$ with a measurement time of $t_0=77[s]$, there arose a $K^*=0.014$ and a drop size $V_T(t_0)=0.020$ [mm$^3$], which it was possible to confirm experimentally very well.

In principle, the above relationships for relative viscosity measurement apply in linear manner only in the region of a given working point. It is therefore advisable to determine corresponding performance maps in advance, as a function of the set process parameters and the material used, and to save them to a database.

The invention claimed is:

1. A method for discharging a volume flow consisting of successive drops to produce a three-dimensional object of solidifiable material, which is either in a fluid phase at the outset or is liquefiable to yield a fluid phase, with the steps introducing the fluid phase of the solidifiable material into a material storage means, generating a pressure on the fluid phase of the solidifiable material in the material storage means, dropwise discharging the solidifiable material from a cyclable outlet opening to build up the three-dimensional object in a construction chamber wherein the fluid phase of the solidifiable material has a viscosity dependent on temperature, wherein at least one process parameter is tracked during the production of the three-dimensional object while maintaining the other process parameters, to adapt the drop size, wherein a change in viscosity of the fluid phase of the solidifiable material is continuously detected, wherein the pressure in the material storage means as the at least one process parameter is regulated via a closed-loop control in the event of a change in the viscosity of the fluid phase of the solidifiable material, while maintaining the other process parameters, to achieve a predetermined drop size, and wherein the pressure is applied by a conveying element, the average displacement velocity of the conveying element per discharged drop being converted as a measured variable into the control variable for the closed-loop control.

2. A method according to claim 1, wherein the measured variable for the tracking of the constant drop volume is determined dynamically by a rolling method.

3. A method according to claim 1, wherein the conveying element is a screw conveying the fluid phase of the solidifiable material into the material storage means.

4. A method according to claim 1, wherein the conveying element comprises a non-return valve with a leakage flow, which is taken into account in the closed-loop control by determining a correction factor ($k^*$).

5. A method according to claim 1, wherein a controller of the closed-loop control is a proportional controller and a characteristic value is corrected by means of a proportional control algorithm.

6. A method according to claim 1, wherein, on detecting of the measured variable, system- and material-specific limit values are predetermined or precalculated, a system defect being detected if they are exceeded.

* * * * *